Figure 3:
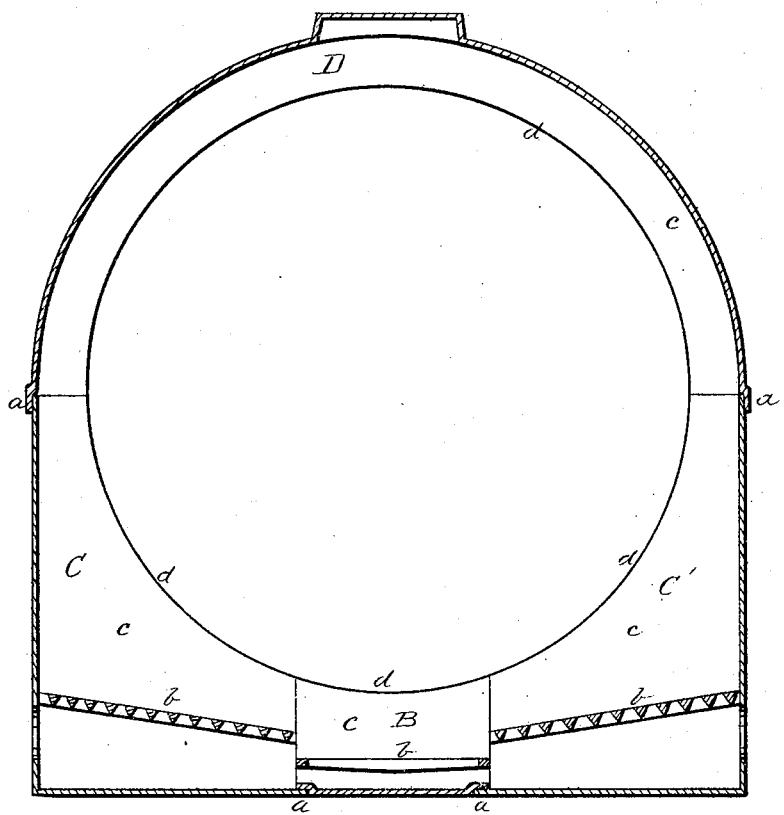

T. T. PEAK.
Locomotive Tire-Heater.
No. 167,115.                    Patented Aug. 24, 1875.
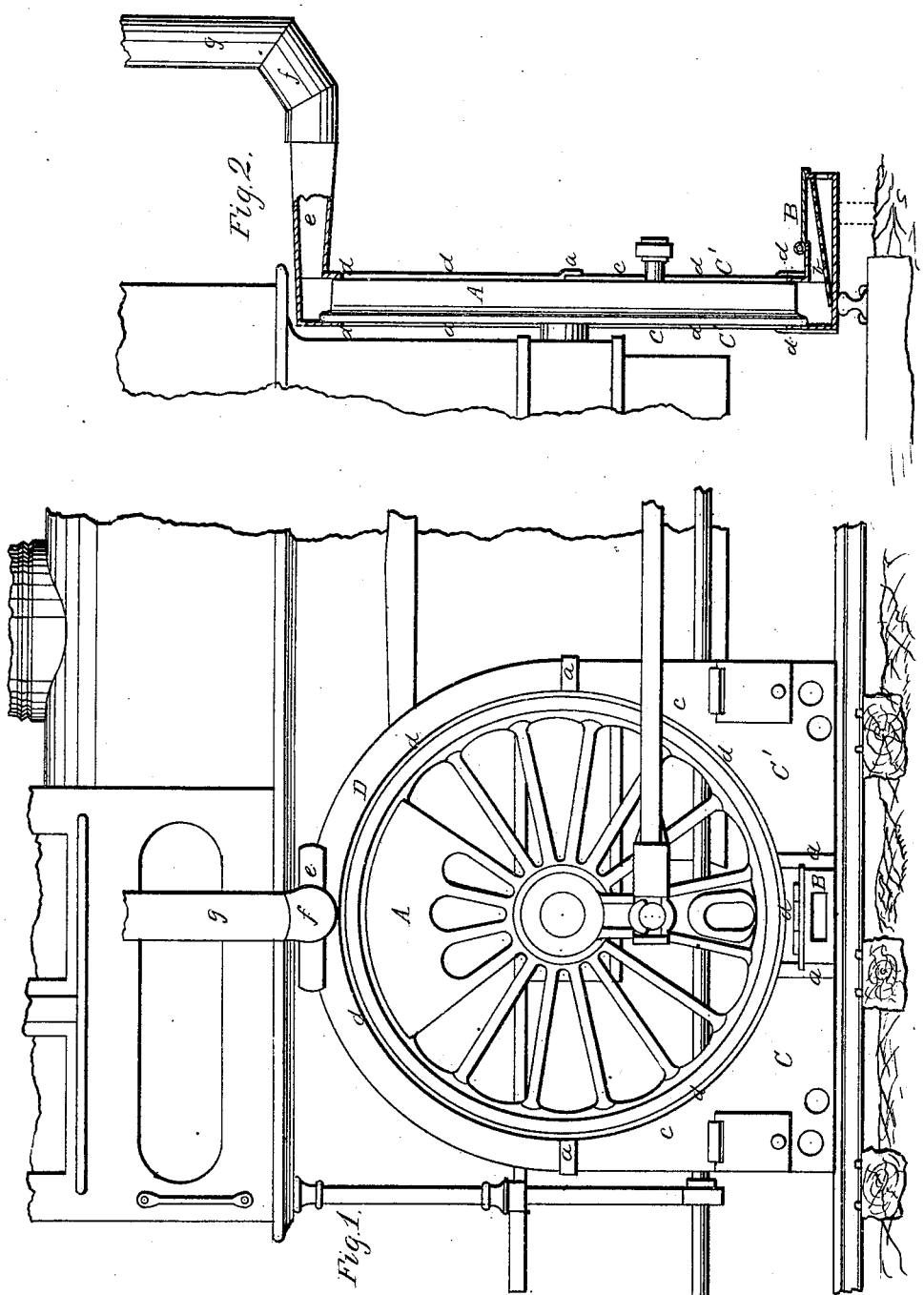

2 Sheets--Sheet 2.

T. T. PEAK.
Locomotive Tire-Heater.

No. 167,115. Patented Aug. 24, 1875.

WITNESSES
Robert Everett
George E. Upham

INVENTOR
Thomas T. Peak,
Chipman and Osmun & Co.
ATTORNEYS

UNITED STATES PATENT OFFICE.

THOMAS T. PEAK, OF ELDORA, IOWA, ASSIGNOR OF ONE-HALF HIS RIGHT TO F. B. WOODRUFF, OF SAME PLACE.

IMPROVEMENT IN LOCOMOTIVE-TIRE HEATERS.

Specification forming part of Letters Patent No. 167,115, dated August 24, 1875; application filed May 22, 1875.

*To all whom it may concern:*

Be it known that I, THOMAS T. PEAK, of Eldora, in the county of Hardin and State of Iowa, have invented a new and valuable Improvement in Locomotive-Tire Heaters; and I do hereby declare that the following is a full, clear, and exact description of the construction and operation of the same, reference being had to the annexed drawings making a part of this specification, and to the letters and figures of reference marked thereon.

Figure 1 of the drawings is a representation of a front view of my device, and Figs. 2 and 3 are sectional views of the same.

This invention has relation to means for heating the tires of the driving-wheels of locomotives and other vehicles; and it consists in the construction and novel arrangement of a sectional furnace adapted to be built up around the tire of the "driver" without detaching the same from the locomotive, as hereinafter fully shown and described.

The object of the invention is to enable the tire to be heated for "shimming" or other purpose without removing it from place. This will materially facilitate the repair of locomotive-drivers and other wheel-engines of great weight.

In the accompanying drawings, the letter A indicates the driver of a locomotive in the heater. The driver is raised slightly with a suitable jack. B represents the central section of the lower portion of the furnace. C C' designate the side sections of the lower portion. These lower sections are connected with embracing-flanges a, and are provided with gratings b, upon which the fires are made. D represents the top section, which is of semi-circular form and is connected with the upper ends of the side sections C C' by means of embracing-flanges a. When built up, the inside wall of the furnace is formed by the tire of the wheel. Each section has its inner side open, the parallel vertical walls c terminating by free edges, as shown. These free edges, when the furnace is built up, form the border of a circular opening, within which is the body of the wheel. The edges of the sections are not designed to reach quite to the inner edge of the tire, in order that there may be no obstruction to the workman in his operations, especially in "shimming" the driver or introducing between the heated tire and the body of the wheel the thin strips of sheet metal whereby the tire is tightened. The free edges d of the section-walls may be held closely to the faces of the tire by means of ordinary shop-clamps, and, in order to secure a tight joint, any common luting may be employed along the edge wherever necessary. The lower sections are the fire-boxes, and in them the fire is kindled with petroleum and waste-wood or other quickly-burning fuel, the flames passing upward around the "tread" of the tire and quickly bringing the same to the required temperature.

The draft may be regulated by suitable dampers to control the heat.

As each side has an independent furnace section, the application of heat to either side may be effected without reference to the other, if desired; or one side may be cooled while the heat is being applied to the other. From the central or highest portion of the upper section D a tubular neck, e, extends outward a sufficient distance to clear the running-board of the engine. To this may be attached a suitable elbow, f, and length of pipe, g, whereby the smoke and products of combustion may be conveyed away out of the round-house or shop.

In building up this furnace it is only necessary to jack up the engine sufficiently to introduce the lower central fire-box. This is designed to heat this part of the wheel in an especial manner, because it is the lowest portion thereof, and generally sufficiently removed from the side fire-boxes to need an independent heating-flame.

What I claim as new, and desire to secure by Letters Patent, is—

A sectional tire-heating furnace, adapted to be built up around a tire, and composed of loose fire-boxes and a cap, having free inside circular edges d jointed together, substantially as specified.

In testimony that I claim the above I have hereunto subscribed my name in the presence of two witnesses.

THOMAS TURNER PEAK.

Witnesses:
R. T. CAMPBELL,
GEORGE E. UPHAM.